Patented Nov. 10, 1942

2,301,331

UNITED STATES PATENT OFFICE 2,301,331

CHEWING GUM

Jacob M. Schantz, Wilmington, Del., assignor to Hercules Powder Company, Wilmington, Del., a corporation of Delaware No Drawing. Application June 4, 1940, Serial No. 338,744

12 Claims. (Cl. 99—135)

This invention relates to chewing gum and, more particularly, to an improved chewing gum base.

Chewing gum is commonly made from a base which comprises as a principal ingredient a rubber-like material such as, gum chicle, rubber latex, or factice, compounded with other suitable materials such as a resinous component as, for example, coumarone resin together with certain other components which give the base the desired properties. The base thus prepared is commonly mixed with suitable filling and flavoring ingredients such as various flavoring essential oils, sweetening materials such as sugar or glucose syrup or a mixture thereof, and the like to give the finished gum. Prior chewing gum compositions are disadvantageous for various reasons, among which are high cost of the constituents, particularly where gum chicle is employed in large proportion, instability when stored for any extended period of time, deterioration upon aging which brings about undesired flavors and odors and which renders the product unduly brittle, drying out and hardening upon the passage of time, inability to retain flavors for the desired period of time after consumption of the product is begun, and other defects. Frequently, the composition has been of improper consistency for chewing and has possessed too much tackiness when chewing, or too little consistency to be satisfactorily chewed. In other cases, the product has had the objectionable characteristic of hardening to an extremely brittle state between manufacture and use. In some cases, exudation or spewing of the flavoring constituents has occurred due to improper compounding of the chewing gum or to insufficient compatibility between the several components thereof.

An object of the present invention is to provide an improved chewing gum overcoming, to a large extent, the disadvantages of the prior chewing gums set forth above.

Another object is to provide a chewing gum base which, by itself or when incorporated with suitable flavoring or filling constituents, exhibits improved properties among which are proper consistency both for manufacture and use, freedom from objectionable taste or odor, good masticatory properties, better compatibility of the various ingredients with one another, reduced tendency to dry out or harden, and numerous other advantages set forth below.

Another object is to provide a chewing gum base which embodies a resinous constituent and which is free from objectionable taste or odor.

Numerous other objects of the present invention will more fully hereinafter appear.

I have discovered that, by the employment of hydrogenated rosin in chewing gum, there results a product which has superior properties as compared with chewing gums made with other resinous constituents heretofore proposed. By the use of hydrogenated rosin, the bitterness and resinous tastes which are noticeable in chewing gum bases prepared with many resinous materials and which are accentuated by the admixture of the sweetening ingredients therewith, by virtue of the known property of sugar of enhancing tastes other than sweet tastes, are substantially eliminated. In addition, chewing gum embodying hydrogenated rosin possesses numerous other advantages not heretofore attained. The chewing gum is adapted to be stored for extremely long periods of time without objectionable deterioration, such as the development of hardness, brittleness, crumbliness, tackiness, exudation or separation of any of the components, and particularly the sugar syrup employed in the formulation. The light color of hydrogenated rosin is an additional advantage. Moreover, hydrogenated rosin imparts no objectionable taste or odor to the chewing gum, either as originally prepared or after storage for a long period of time. Hydrogenated rosin is wholly without physiological reaction when incorporated in chewing gum by reason of its purity, inert nature, and blandness. In addition, hydrogenated rosin blends readily with the other components of the chewing gum.

In addition, the use of hydrogenated rosin in the chewing gum results in excellent retention of flavor both upon long storage and long chewing which presents a marked advantage over many of the prior resinous materials.

The use of hydrogenated rosin in chewing gum is additionally advantageous because it produces a chewing gum which is very resistant to deterioration. The hydrogenated rosin itself is substantially free from any tendency to deteriorate as a result of exposure to air and light. Moreover, chewing gum made with hydrogenated rosin combined with rubber-like material and other ingredients has good aging properties.

The hydrogenated rosin component of the chewing gum base may be made in any known manner whereby the rosin has its double bonds partially or completely saturated with hydrogen as, for example, by treatment of rosin, either gum rosin, wood rosin, or other rosin in molten form or in solution in a volatile organic solvent, with gaseous hydrogen in the presence of a hydrogenating catalyst such as reduced nickel at elevated temperature and pressure, for the period of time necessary to produce the desired saturation. While hydrogenated rosin of a low degree of saturation may be employed, I prefer to employ hydrogenated rosin wherein the unsaturation is reduced by at least 50% of the theoretical for the two double bonds contained in the abietic acid molecule, by combination with hydrogen.

This means that on an average at least one of the two double bonds in the rosin has been saturated with hydrogen. The more saturated the rosin, the more desirable it is for use in a chewing gum base and, in some cases, I may employ rosin which is saturated to at least 95% of the theoretical or even 100% of the theoretical. The rosin which is subjected to hydrogenation may have been previously subjected to suitable refining processes to reduce its color, taste, and odor, using any of the known rosin refining processes for this purpose. In place of, or in addition to such treatment of the rosin before hydrogenation, it may be desirable to treat the hydrogenated product by the known refining processes for the elimination of color, taste, and odor producing bodies therein. I have found that I can use the commercially available hydrogenated rosin which is at least 50% saturated, which has the desired pale color, which is substantially free from taste and odor or taste and odor-producing bodies, these properties being retained upon exposure to air and light.

Instead of hydrogenated rosin, equivalent hydrogenated materials may be employed in chewing gum in accordance with the present invention such as, hydrogenated commercial abietic acid, hydrogenated pure abietic acid, hydrogenated pimaric acid, hydrogenated heat treated rosin, hydrogenated isomerized rosin, etc.

In accordance with the present invention, the hydrogenated rosin is preferably admixed with a rubber-like material such as, gum chicle or substitutes therefor such as crepe rubber, rubber latex, guayule rubber, gutta percha, gutta siak, jelutong, balata, factice, or the like. Natural rubber either as such or in the form of an aqueous dispersion, such as rubber latex, may be desirably employed as the rubber-like constituent of the chewing gum base. Instead of employing natural rubber, synthetic rubber and latices made therewith may be used such as, for exmple, polychlorobutadiene, polydimethylbutadiene, polybutadiene, etc. As the rubber-like material, it is preferred to use so-called "synthetic" chicle, that is low grade natural vegetable rubber-like materials too high in resin content (resin content ranging from about 25% and usually from about 40% to about 90%) to be useful for rubber, such as materials selected from the group consisting of gutta percha, jelutong, balata, gum tuno, Namaqualand rubber (from *Euphorbia drageana*), almeidina or Euphorbia gum, abba rubber, and inferior guttas such as gutta siak, gutta cotie, gutta kay, gutta hangkang, gutta jangkar, gutta sundik, gutta soh, gutta susu, gutta penag, yellow gutta, and related materials, and mixtures of the foregoing materials with one another or with gum chicle which is such a low grade natural rubber-like material. Hydrogenated rosin is completely miscible or compatible with the rubber-like materials named. Instead of using a single rubber-like material, mixtures of two or more thereof may be employed. The rubber-like material is employed in an amount such as to yield a ratio to hydrogenated rosin lying within the range of from about 20 to 1 to about 1 to 10 and preferably from about 2 to 1 to about 1 to 2.5. Equal parts by weight of the rubber-like material and hydrogenated rosin form a particularly desirable chewing gum base.

In addition to the rubber-like material and the hydrogenated rosin, the chewing gum base in accordance with the present invention may, if desired, embody other resins, synthetic or natural, such as ordinary rosin, ester gum, coumarone resin, pontianak resin, copal gum, kauri gum, dammar gum, sweet bay gum, spruce gum, balsams and the like. However, it is preferred to keep the percentages of these other resins at a minimum in view of the fact that they have a tendency, when used in large proportions, to impart objectionable characteristics to the chewing gum.

There may be incorporated with the materials making up the chewing gum base, an oily softening agent, such as petrolatum, beef stearin, vegetable oil, such as cottonseed oil, olive oil, etc., petroleum oil, such as water white mineral oil and the like, or hydrogenated vegetable oil, such as hydrogenated cottonseed oil which is solid at ordinary temperature, etc., the oily softening agent preferably being present in limited amount, say not over 25% of the chewing gum base, so as to impart no objectionable oily characteristic or flavor to the chewing gum. In addition, it is frequently desirable to incorporate in the composition a wax or wax-like material, such as paraffin wax, beeswax, stearic acid, candelilla wax, ceresin wax, etc. The amount of wax employed may vary up to about 25% in the normal composition. If desired, however, the wax content may be as high as 50 to 70% by weight of the chewing gum base. Ordinarily, however, the use of such extremely high percentages does not produce a chewing gum of the desired masticatory properties and therefore, it is necessary when using such high percentages to modify the formulation considerably from the more usual formulation in order to obtain a chewing gum base of desired properties.

The components of the chewing gum base are intermingled with one another in any manner which gives a homogeneous intimate mixture. The method of compounding will depend upon the form in which the several components are introduced. The rubber-like material and the hydrogenated rosin may be admixed with each other by heating them together to a temperature at which they are fluent. Preferably the mixture is stirred and maintained at an elevated temperature for a prolonged period of time. If other components are employed, such as resins other than the hydrogenated rosin, a waxy material, or an oily softening agent, these other components may be commingled with the principal ingredients in the same manner. It has been found to be particularly advantageous to effect the intermixture by working the mixture on a roll mill at temperatures below the melting point of the resinous and rubbery ingredients, passing it through the rolls a number of times until the desired degree of intermixture is effected. Such a method produces chewing gums which are superior to those which are compounded at higher temperatures. Where a wax-like material and an oily softening agent are used in the mixture, admixture may be effected by heating the oily softening material with the waxy material to an elevated temperature after which the rubber-like material and the hydrogenated rosin are stirred into the hot mixture until it is uniform. Where a large proportion of waxy material is used in the composition, it has been found to be advantageous to first mix the waxy material with the solid rubber-like component and heat to an elevated temperature until the waxy component is molten, with stirring and maintenance of the temperature until a homogeneous mass is obtained, following which the resinous component and any other desired components may be added to the mixture.

The foregoing methods of mixing are particularly advantageous where a solid rubber-like material such as crepe rubber or gum chicle or the like is employed. Where the rubber-like material is employed in the form of an aqueous dispersion, as where rubber latex is employed, the latex may be mixed with the other components of the formulation at room temperature, after which they may be heated to an elevated temperature until the water in the latex or initially present in the composition has been evaporated.

It is frequently desirable to incorporate small amounts of water in the composition, this being particularly desirable where the rubber-like material is in solid form. The admixture of water in this manner produces a mellowing and softening effect on the gum. The amounts of water incorporated in this manner may vary up to say 10% of the chewing gum base where the rubber-like component is in solid form. Where an aqueous dispersion of the rubber-like component is employed, it may in some cases be desirable to incorporate as much as 30 or 40% by weight of water in the composition, and similar large amounts of water may, if desired, be used where the rubber-like constituent is in solid form.

Ordinarily, the amount of water left in the final chewing gum base will not exceed 5 or 10%. Water in such amounts is frequently very advantageous because of the desirable consistency and ease of manufacture into the final gum which it imparts to the chewing gum base.

The hot chewing gum base prepared as described above may be allowed to cool and the sweetening and flavoring ingredients incorporated subsequently in any desired manner, or the flavoring and sweetening constituents may be added to the chewing gum base while it is still hot. In order to effect the desired sweetening of the chewing gum base, there may be employed the usual mixture of powdered sugar and glucose syrup, or other sweetening agents such as invert sugar, levulose, saccharin, etc. As the flavoring constituents, there may be employed the usual flavoring ingredients such as oil of peppermint, spearmint, wintergreen, etc., licorice, vanilla, vanillin, etc., and, where gum chicle is not present in the mixture, dry cocoa powder, cocoa syrup (which is both a sweetening material and flavoring agent), etc.

There may be incorporated in the mixture small amounts of a suitable filler material such as clay, calcium carbonate, magnesium carbonate, magnesium oxide, barium sulfate, calcium sulfate, carbon black, activated carbon, or suitable medicating agents, such as phenolphthalein, mannitol, etc. Where cocoa powder is employed as flavoring constituent, it also acts as a filler.

Below are given several specific examples showing typical methods of preparing a chewing gum base or chewing gum embodying the principles of the present invention. The hydrogenated rosin component employed in these examples was rosin, the unsaturation of which had been reduced by approximately 70% of the theoretical for two double bonds by combination with hydrogen in the known manner. This hydrogenated rosin had an acid number of 168, a color of 5 amber (X on the rosin color scale), a thiocyanate value of about 20, and a melting point (drop) of 79° C. It will be understood, however, that the present invention is not limited to the use of this particular hydrogenated rosin. For example, I may use hydrogenated rosin having a saturation of about 60%, an acid number of 161, a melting point (drop) of 76° C. and a color of 7.0 amber or hydrogenated rosin having a saturation of about 60%, an acid number of 161, a melting point (drop) of 75° C., and a color of 15 amber (WW+). I prefer to use hydrogenated rosin free from rosin decomposition products such as rosin oil or decarboxylated rosin. Thus, in general, it is preferred to employ a hydrogenated rosin which is saturated from about 50% up to about 100%, which is of the desired light color in order not to impart objectionable color to the resulting chewing gum, say within the range of from 40A+2R to 2A (H to X+ on the rosin scale), which has a thiocyanate value of from about 5 to about 50, a melting point of from about 60° C. to about 80° C., and an acid number of from about 130 to about 170.

*Example 1*

A factice was first prepared from the following constituents:

| | Grams |
|---|---|
| Cottonseed oil | 74.4 |
| Carbon disulfide | 25.4 |
| Sulfur monochloride | 34.0 |

These components were mixed until gas was evolved. Then the liquid mixture was poured onto a glass plate and allowed to set. The rubber-like sheet thus produced was ground in a mortar. 88 g. of the resulting powdered rubber-like material was mixed with 2.6 g. of methyl alcohol and 160 g. of sulfur monochloride, the mixture stirred and allowed to stand two hours. The liquid thus obtained was poured slowly into two liters of water at 20° C. with vigorous stirring. The factice which was insoluble in the water and consequently precipitated thereby, was separated from the water, washed, and rolled into a thin sheet which was allowed to dry.

A chewing gum base was next prepared in accordance with the following formula:

| | Grams |
|---|---|
| Factice (prepared as above) | 35 |
| Hydrogenated rosin | 35 |

The factice and the hydrogenated rosin were heated together to 115° C. and kept at this temperature for about two hours, whereupon the hot material was poured into a mold and allowed to cool. A firm, plastic material was obtained. When used as a chewing gum base, this material had excellent characteristics.

In this example the percentage of hydrogenated rosin may be varied from 5 to 60%. Likewise, while a temperature of 115° C. was employed, temperatures varying from 60 to 150° C. may be used. The time of heating used may also vary from about 15 minutes to 8 hours, depending upon the temperature used.

*Example 2*

| | Parts by weight | Percentage by weight |
|---|---|---|
| Crepe rubber | 25 | 23.8 |
| Gum chicle | 25 | 23.8 |
| Hydrogenated rosin | 25 | 23.8 |
| Hydrogenated cottonseed oil ("Crisco") | 15 | 14.3 |
| Stearic acid | 15 | 14.3 |

The stearic acid and the hydrogenated cottonseed oil were melted together and heated to 150° C. Then the rubber was slowly added in small portions with stirring and the temperature was slowly raised to 165° C. The gum chicle was added and the mixture stirred until uniform. Then the hydrogenated rosin was added and the mixture again stirred until uniform, whereupon it was poured into a mold and allowed to cool. There was obtained a soft plastic mass which was highly resistant to deterioration upon aging, and which, when sweetened and flavored, yielded a chewing gum having very desirable chewing characteristics and good retention of flavor.

While temperatures of 150 to 165° C. were used in this example, temperatures varying between 100° C. and 250° C. may be employed. The time of heating necessary may range from 30 minutes to 8 or 10 hours depending upon the temperature used.

*Example 3*

|  | Parts by weight | Percentage by weight |
|---|---|---|
| Paraffin (melting point 125° F.) | 100 | 68.9 |
| Crepe rubber | 20 | 13.8 |
| Hydrogenated rosin | 12 | 8.3 |
| Coumarone resin | 3.6 | 2.5 |
| Beeswax | 6 | 4.1 |
| Water | 3 | 2.1 |

The paraffin and rubber were mixed and heated until the paraffin melted, then heated slowly with intermittent stirring to 135° C. until the mass became liquid. Then the temperature was slowly raised to 145–150° C. Then the hydrogenated rosin, the coumarone resin and the beeswax were added, the mixture stirred until uniform, and then allowed to cool. When the mixture had cooled to 95–100° C., the water was stirred into it, and stirring was continued until a uniform mass was obtained. The hot mixture thus obtained was poured into a mold and allowed to cool. A light colored, firm material with good chewing qualities was obtained. The material exhibited good resistance to deterioration upon aging.

The temperature used in this example need not be limited to 135 to 150° C. but can be varied from about 100° C. to about 250° C. The time required may range from 30 minutes to 10 hours hours depending upon the temperature used.

*Example 4*

|  | Parts by weight | Percentages by weight on a water-free, cocoa-free basis |
|---|---|---|
| Rubber latex (40 per cent rubber) | 40 | 15.1 (rubber) |
| Water | 40 | |
| Hydrogenated rosin (pulverized) | 40 | 37.7 |
| Stearic acid | 25 | 23.6 |
| Hydrogenated cottonseed oil ("Crisco") | 25 | 23.6 |
| Cocoa powder | 7 | |

These materials were thoroughly mixed at room temperature, then heated slowly to 100–115° C. with stirring and maintained at this temperature until all of the water and the latex preservative (ammonia or formaldehyde) had been driven off. The time required was about 1 hour. The hot mixture was then poured into a mold and allowed to cool. A dark-colored chewing gum was obtained. The dark color was due to the cocoa powder which acted as a flavoring agent. The product was plastic and soft and very resistant to deterioration upon aging.

In this example, the cocoa powder is readily incorporated into the chewing gum, a rubber-like material containing no gum chicle being employed. In this example, the ratio of actual rubber (derived from the latex) to hydrogenated rosin was 1 to 2.5. However, if desired, this ratio may be increased to, say 1 to 1. In addition, it is permissible to use temperatures varying from 100 to 200° C. As before, the time required may vary from 15 minutes to 5 hours, depending upon the temperature and pressure employed.

*Example 5*

In accordance with this example, a chewing gum base was made exactly as in Example 4 except that the cocoa powder was omitted. A very light colored product having very satisfactory characteristics as a chewing gum base was obtained.

From the foregoing, it will be seen that the present invention provides a chewing gum base or chewing gum made therefrom of improved properties. The chewing gum base and the chewing gum made therewith is more stable and therefore can be stored for a longer period of time without deterioration which renders ordinary chewing gum crumbly and discolored. In addition, the chewing gum made in accordance with the present invention possesses no objectionable taste or odor, either when first prepared or after extremely long periods of time, and presents no harmful characteristics. Numerous other advantages of chewing gum made in accordance with the present invention will be obvious to those skilled in the art.

It will be understood that the details and examples hereinbefore set forth are illustrative only and that the invention as broadly described and claimed is in no way limited thereby.

What I claim and desire to protect by Letters Patent is:

1. A chewing gum material comprising hydrogenated rosin, said hydrogenated rosin imparting to said chewing gum material resinous properties, an improved resistance to deterioration over long periods of time, no objectionable taste or odor, and no objectionable physiological characteristics.

2. A chewing gum material comprising hydrogenated rosin, the unsaturation of which is reduced by at least 50% of theoretical for two double bonds by combination with hydrogen, said hydrogenated rosin imparting to said chewing gum material resinous properties, an improved resistance to deterioration over long periods of time, no objectionable taste or odor, and no objectionable physiological characteristics.

3. A chewing gum material comprising hydrogenated rosin, and rubber-like material, said hydrogenated rosin imparting to said chewing gum material resinous properties, an improved resistance to deterioration over long periods of time, no objectionable taste or odor, and no objectionable physiological characteristics.

4. A chewing gum material comprising hydrogenated rosin, rubber-like material, a waxy material, and an oily softening agent, said hydrogenated rosin imparting to said chewing gum material resinous properties, an improved resistance to deterioration over long periods of time, no objectionable taste or odor, and no objectionable physiological characteristics.

5. A chewing gum material comprising hydrogenated rosin and gum chicle, said hydrogenated rosin imparting to said chewing gum material resinous properties, an improved resistance to deterioration over long periods of time, no objectionable taste or odor, and no objectionable physiological characteristics.

6. A chewing gum material comprising a rubber-like material and hydrogenated rosin, said material and said hydrogenated rosin being present in such proportions as to yield a ratio of said material to said hydrogenated rosin of from about 2 to 1 to about 1 to 2.5, said hydrogenated rosin imparting to said chewing gum material resinous properties, an improved resistance to deterioration over long periods of time, no objectionable taste or odor, and no objectionable physiological characteristics.

7. A chewing gum material comprising about equal parts of a rubber-like material and hydrogenated rosin, said hydrogenated rosin imparting to said chewing gum material resinous properties, an improved resistance to deterioration over long periods of time, no objectionable taste or odor, and no objectionable physiological characteristics.

8. A chewing gum material comprising hydrogenated rosin, rubber-like material, and an oily softening agent, said hydrogenated rosin imparting to said chewing gum material resinous properties, an improved resistance to deterioration over long periods of time, no objectionable taste or odor, and no objectionable physiological characteristics.

9. A chewing gum material comprising hydrogenated rosin, the unsaturation of which is reduced by from about 50% to about 100% of theoretical for two double bonds by combination with hydrogen, which has a color lying within the range of 40A+2R to 2A, a thiocyanate value of from about 5 to about 50, a melting point of from about 60° C. to about 80° C., and an acid number of from about 130 to about 170, said hydrogenated rosin imparting to said chewing gum material resinous properties, an improved resistance to deterioration over long periods of time, no objectionable taste or odor, and no objectionable physiological characteristics.

10. A chewing gum material comprising hydrogenated rosin and a low grade natural rubber-like material too high in resin content to be useful for rubber and selected from the group consisting of gutta percha, jelutong, balata, gum tuno, Namaqualand rubber, almeidina gum, inferior guttas, and related materials, and mixtures thereof with one another and with gum chicle, said hydrogenated rosin imparting to said chewing gum material resinous properties, an improved resistance to deterioration over long periods of time, no objectionable taste or odor, and no objectionable physiological characteristics.

11. The method for preparing a chewing gum material which comprises incorporating hydrogenated rosin thereinto as a substantial component of the material, said hydrogenated rosin imparting to said chewing gum material resinous properties, an improved resistance to deterioration over long periods of time, no objectionable taste or odor, and no objectionable physiological characteristics.

12. The method for preparing a chewing gum material comprising hydrogenated rosin and a rubber-like material which comprises compounding hydrogenated rosin with the other ingredients of the material at a temperature below the melting point of the resinous and rubbery ingredients of the material to form a homogeneous intimate mixture, said hydrogenated rosin imparting to said chewing gum material resinous properties, an improved resistance to deterioration over long periods of time, no objectionable taste or odor, and no objectionable physiological characteristics.

JACOB M. SCHANTZ.